J. BOON.
Car Wheel.

No. 7,282  
Patented Apr. 16, 1850.

UNITED STATES PATENT OFFICE.

JAMES BOON, OF LANCASTER, PENNSYLVANIA.

CAST-IRON CAR-WHEEL.

Specification of Letters Patent No. 7,282, dated April 16, 1850.

*To all whom it may concern:*

Be it known that I, JAMES BOON, city of Lancaster, State of Pennsylvania, have invented a new and Improved Chilled Railroad Cast-Iron Car-Wheel; and I do hereby declare that the following is a full and exact description thereof, reference being had to the accompanying drawings, making a part of this specification, and to the letters of reference marked thereon.

To enable others skilled in the art, to make and use my invention I will proceed to describe its construction.

A represents the hub, B the arms or spokes, C the ovals or circular arches, D the inverted flanges, forming a hollow rim, E the outside flange of the car wheel.

Figure 1:
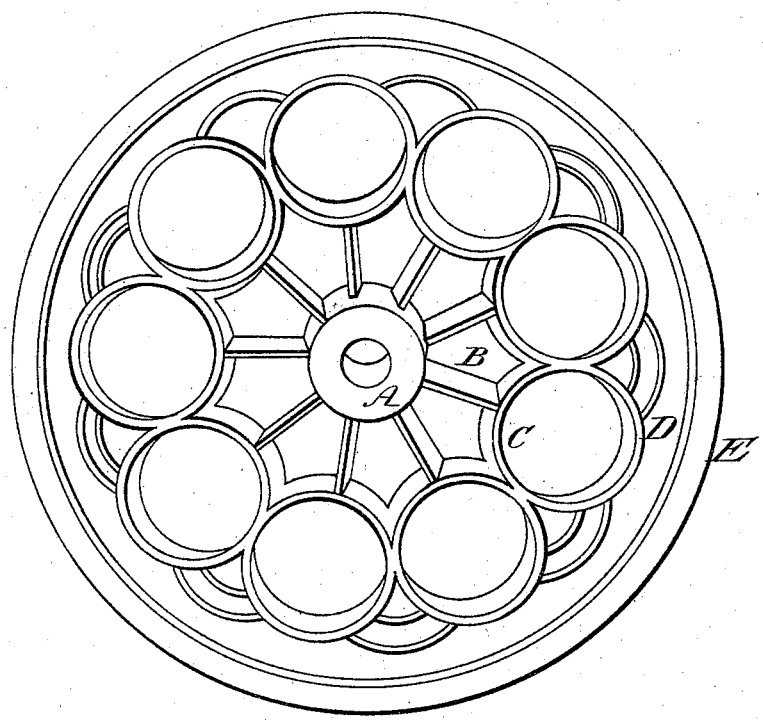
Figure 2:
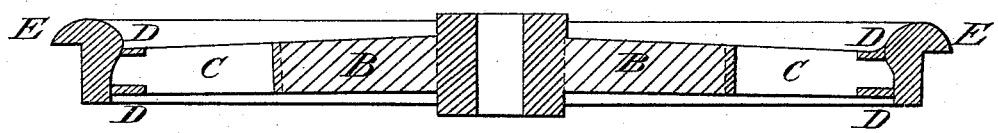

Figure 1 is a view of the wheel, Fig. 2, a cross section.

My object is to have the rim D cast so as not to be immediately connected with the spokes B or any body of iron, so as to cause an irregularity in the chilling; this I accomplish by two inverted flanges D (about 2½ inches in width) around the inner side of the wheel, one on each side of the periphery of the wheel, forming a hollow rim, to be connected with the ovals C or circular part of the spokes, which spokes B are about 5 inches in length attached to the hub A.

In casting the wheels as heretofore, where the spokes come directly in contact with the rim, the chill is imperfect, and the rim becomes imperfect; but by my invention I secure to a spoke wheel, the advantages of a uniform chill; another advantage is, that the metal in this wheel need not be so hard, from the fact that the rim is a uniform thickness, while in others where the spokes come in contact with the rim, the quantity of metal is greater and causes irregularity in the wear. By this rim D, being cast hollow, the chill is more even, and regular, and the contraction of the hub while chilling, acts only upon the circles or ovals, and their elasticity preserves the most perfect form of a wheel, and the cracking or breaking of the wheel avoided, and the advantages of a solid hub secured.

What I claim as my invention, and desire to secure by Letters Patent is—

The casting a chilled railroad cast iron car wheel, giving a uniform chill to the wheel, by separating the arms B from the rim of the wheel, by the inverted flanges D forming a hollow rim, together with the combination of the arches or ovals C, as herein described; thus using the solid hub to the chilled wheel, adding strength to the whole, and securing regularity in the wear.

JAMES BOON.

Witnesses:
I. FRANKLIN REIGART,
WM. S. AMWEG.